United States Patent [19]

Bone et al.

[11] Patent Number: 4,974,160
[45] Date of Patent: Nov. 27, 1990

[54] MENU SELECTED APPLICATION PROGRAMS CREATED FROM DEFINED MODULES OF CODE

[75] Inventors: William K. Bone, Willowbrook; John M. Giannini, St. Charles, both of Ill.

[73] Assignee: Computer Associates International, Inc., Garden City, N.Y.

[21] Appl. No.: 366,650

[22] Filed: Jun. 15, 1989

Related U.S. Application Data

[63] Continuation of Ser. No. 73,501, Jul. 15, 1987, abandoned.

[51] Int. Cl.⁵ ............................................. G06F 1/00
[52] U.S. Cl. .................................... 364/200; 364/191
[58] Field of Search ..................... 364/300, 191, 401; 235/379

[56] References Cited

U.S. PATENT DOCUMENTS

| | | | |
|---|---|---|---|
| 4,423,316 | 12/1983 | Sano et al. ............................ | 235/379 |
| 4,606,001 | 8/1986 | Rieben et al. ........................ | 364/167 |
| 4,734,854 | 3/1988 | Afshar .................................. | 364/300 |
| 4,742,467 | 5/1988 | Messerich et al. ................... | 364/300 |

FOREIGN PATENT DOCUMENTS

0181438 5/1986 European Pat. Off. .

OTHER PUBLICATIONS

BANKPLUS™ advertisement, *Computers in Banking,* vol. 2, No. 1, Mar. 1985, 12–13.

MAXIM 4700 TM advertisement, *Computers in Banking,* vol. 2, No. 1, Mar. 1985, 48–49.

*Primary Examiner*—Clark A. Jablon
*Attorney, Agent, or Firm*—Weil, Gotshal & Manges

[57] ABSTRACT

A system and method are disclosed for computer implementation of products wherein a designer examines the products desired by an institution planner and identifies functions ("components") collectively common thereto. The designer proceeds to define component processes collectively common to such components and categorizes code for this purpose in groupings selectable (executable) by the planner upon system installation and subsequently changeable as desired. The component process selections of the planner are recorded and the system is thereby defined in its aspect which is accessible to the planner. The designer works from such definitions of all components and component processes obtained from discussion with system planners prior to installations to define component subprocesses collectively common to the component processes and identifies combinations of component subprocesses in various sequences to realize component processes. The code of each component subprocess is stored individually in "modules" for access by a computer to realize such combinations and reuse of such modules in this activity is effective to provide for uniformity in the practice of subcomponent processes from product to product. The designer code for the component subprocess is inaccessible to the planner from a selection viewpoint and is viewed thusly as planner non-executable.

5 Claims, 6 Drawing Sheets

MENU SELECTED APPLICATION PROGRAMS CREATED FROM DEFINED MODULES OF CODE

This application is a division of application Ser. No. 073,501, filed Jul. 15, 1987, now abandoned.

FIELD OF THE INVENTION

This invention relates generally to computer implementation of products and pertains more particularly to improved computer architecture for such purpose.

BACKGROUND OF THE INVENTION

With reference to the banking field as an example, software packages heretofore provided by the assignee of this application have been provided specifically for each banking task. Thus, separate software packages have been provided for DDA (demand deposit accounts), for retirement fund management, and the like.

In preparing such software packages, the in-house software company personnel (designers) fully design the software package based on their understanding, through discussion, of the requirements and desires of the "planner" of products employed by the banking institution (purchaser). The package so designed is per-ordained and largely invariant upon purchaser use and may be considered as code (software) fully executed by the designers.

Applicants are aware of Patent No. 4,346,442, entitled "Securities Brokerage-Cash Management System", issued on Aug. 24, 1982 and disclosing a single software package addressing plural accounting functions. The system of this patent is seen, however, also as being pre-ordained and largely invariant upon purchaser use and as code executed fully as established by the system designers.

From applicants' viewpoint, it would be highly desirable for a planner for an institution to have the ability to ordain the contents of a system at its installation and to have the further ability for adding or modifying system functions after initial installation.

SUMMARY OF THE INVENTION

The present invention has as its primary object the provision of improved architecture for computer systems and software.

A more particular object of the invention is to provide for enhanced planner participation in the computer implementation of systems and products.

In attaining the foregoing and other objects applicants examine the products desired by an institution planner and identify functions ("components") common thereto. They proceed to define component processes common to such components and categorize code for this purpose in groupings selectable (executable) by the planner upon system installation and subsequently changeable as desired. The component process selections of the planner are recorded and the system is thereby defined in its aspect which is accessible to the planner.

In system design, applicants work from such definitions of all components and component processes obtained from discussion with system planners prior to installations to define component subprocesses collectively common to the component processes. System designers effect this activity and identify combinations of component subprocesses in various sequences to realize component processes. The code of each component subprocess is stored individually in "modules" for access by a computer to realize such combinations and reuse of such modules in this activity is effective to provide for uniformity in the practice of subcomponent processes from product to product. The designer code for the component subprocess is inaccessible to the planner from a selection viewpoint and is viewed thusly as planner non-executable.

The system architecture reached by applicants has a first aspect, component processes, which is selectable and thereby executable by an institutional planner, and a second aspect, component subprocesses, not apparent to the institutional planner and fully controlled by the system designer. The system architecture is hybrid in character, with the planner adaptively involved in system and product design.

The foregoing and other objects and features of the invention will be understood from the following detailed description of preferred embodiments and methods thereof and from the drawings wherein like reference numerals identify like parts and components throughout.

DETAILED DESCRIPTION OF PREFERRED EMBODIMENTS

The invention will be described particularly in the business function environment of banking and outset discussion will be had of certain terms and definitions and examples related thereto.

COMPONENT

The system may involve some thirty components, as follows: billing; credit line; currency exchange; delinquency; effective date; float; funds transfer; guarantee deposit; hold; inactivity; interest accrual; interest payment; IRA-Keogh; LIFO-FIFO; rate; rebate-payoff; reconciliation; service charge; special inquiry; third party; and withholding report. As will be seen below, a system component is a transitory entity, not being itself realized or created, but usable in creating system products.

COMPONENT PROCESS

A component process is a step, the practice of which yields a result desired in reaching a product. Assuming a product of interest to a planner to include the billing component, the planner would select a component process associaed with such component, which may comprise the following component processes: compute billing amounts; create receivables; extend payment; funds required; loan overpayment; payment change; reverse payment; update payment change cycle; and waive a bill outstanding. Assuming the product of interest to a planner to include the credit line component, the planner would select from the following credit line component processes: account credit line; commercial credit line; commitment credit line; credit line review; letter of credit posting; and revolving credit line.

In this context, a common product class would be savings and a product thereunder would be passbook savings. To realize this product, component process selections would be made from those of plural components, namely, funds transfer, hold, interest accrual, interest payment, posting and passbook.

COMPONENT SUBPROCESS

A component subprocess is code for effecting a procedure which is a part of a component process. Examples (ACCUMULATE FLOAT, ACCUMULATE FLOAT, BALANCE CALCULATION) are covered below.

LOG POINTS

As above noted, log points are predefined conditions in a component process which collect transaction information, and may indicate log point destinations, such as the making of reports, the printing of notices, batch activity (ordering of checks or coupons), and general ledger entries. In large part, log points are indicative of the attainment of progress throughout the component process, such as verifying the finding of the records involved, the detection of IDMS/R errors, and like monitoring events.

SOURCES

These are the origins of transactions, for example, tellers, automatic teller machines (ATMs). The system is itself the source of various cyclical transactions, such as accounts active daily, daily receivables, daily interest accruals, etc.

TRANSACTIONS

Transactions may be of three varieties. On line transactions would derive from tellers and ATMs and may involve the cashing or depositing of checks. Batch transactions involve such measures as ordering checks and coupons. Cyclical transactions, as above noted, are system as source matters.

TRANSACTION CONTROL

This aspect of system activity involves identification of transaction sources, identification of transaction codes within each source, identification of products and assignment of transaction rules. In system operating discipline, transaction-source-product records are accessed by the CPU to obtain identification of component processes involved (this is indicated by the transaction code of such record as defined in product making), to identify the source and product and to apply transaction rules (valid and invalid amount, dates, limits, etc.).

ACCOUNT GROUPS

These are collections of accounts that share one or more attributes, thus establishing a relationship between accounts. Different products may belong to the same account group, such as a daily accrual cycle account group. An account group hierarchy exists and includes primary account groups, which are entered based on the component processes selected for products during product definition. Non-primary account groups are dependent on primary account groups and nested thereunder.

MODEL RECORDS

These records, also termed junction records, connect an account to an account group and store information to open a new account or to process existing accounts. Each model record is associated with at least one component process. A model record is connected to an account group during definition of a product and a copy of the model record is connected to a new account when it is added.

As will be appreciated the matters of transactions, transaction controls, account groups and model records represent discipline within the system and effect housekeeping together with the IDMS/R. In the interests of simplification, these items are not discussed in great detail.

Figure 1:
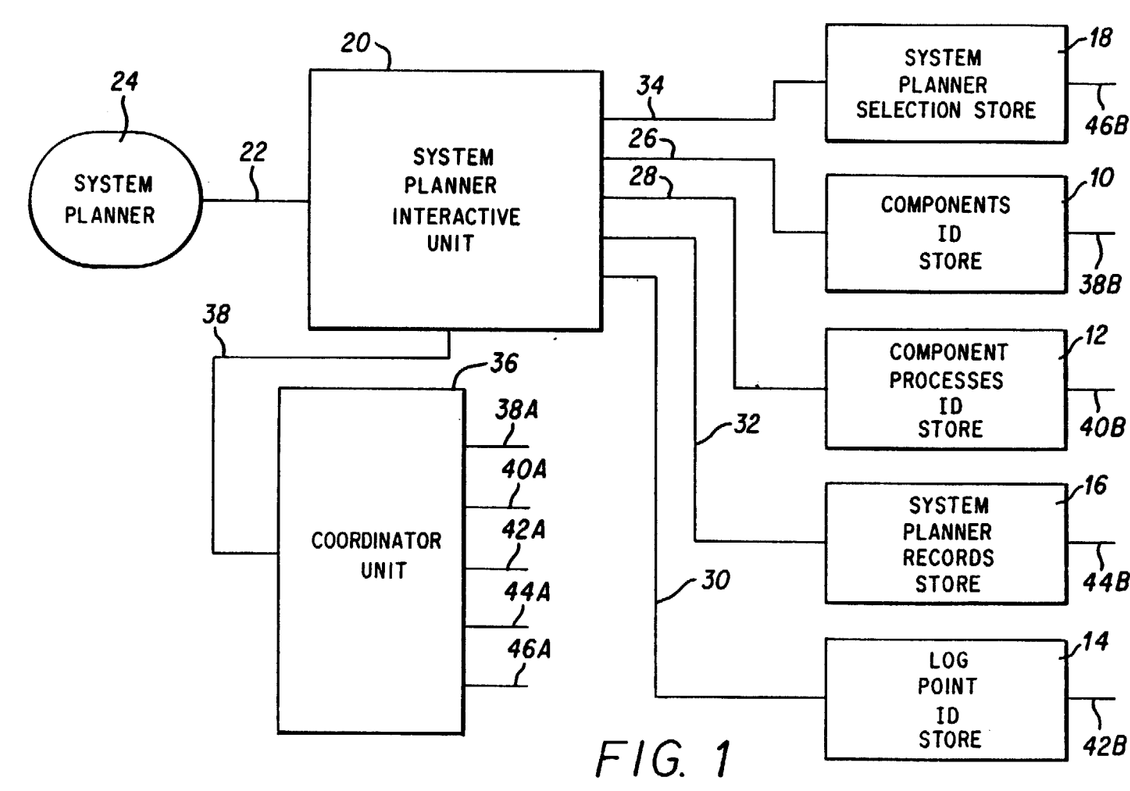
FIG. 1 is a block diagram of the system of the invention configured in its product planning phase.

Turning from the above definitions of terms, and referring to FIG. 1, same shows a block diagram of the system in its product planning phase. Information stores 10, 12 and 14 contain digital signals indicative of literal legends to be presented to the system planner. Store 10 (COMPONENTS ID STORE) contains signals literally identifying the components of the system Store 12 (COMPONENT PROCESSES ID STORE) contains signals literally identifying the component processes in recall groupings associated with the related component. Store 14 (LOG POINT ID STORE) contains signals literally identifying log points in recall groupings associated with the related component process. Two further stores are involved in FIG. 1, namely, 16 and 18. Store 18 (SYSTEM PLANNER RECORDS STORE) serves to store signals indicative of records accumulated during product definition. Store 18 (SYSTEM PLANNER SELECTION STORE) serves to store signals indicative of the various selection of the planner regarding product classes, product names, component processes and log points.

A terminal 20 (SYSTEM PLANNER INTERACTIVE UNIT), which may be constituted of a keyboard, CRT display and associated electronics, is provided for viewing and operation 22 by a SYSTEM PLANNER 24. Lines 26, 28, 30, 32 and 34 connect terminal 20 with stores 10, 12, 14, 16 and 18, respectively.

A COORDINATOR UNIT 36 coordinates activities of the remaining system components of FIG. 1 to practice various planning steps in manner discussed in connection with the flow chart of FIG. 2 below. Controller 36 is connected to terminal 20 by line 38 and to stores 10, 12, 14, 16 and 18 over lines 38A, 38B, 40A, 40B, 42A, 42B, 44A, 44B, 46A and 46B.

Figure 2:
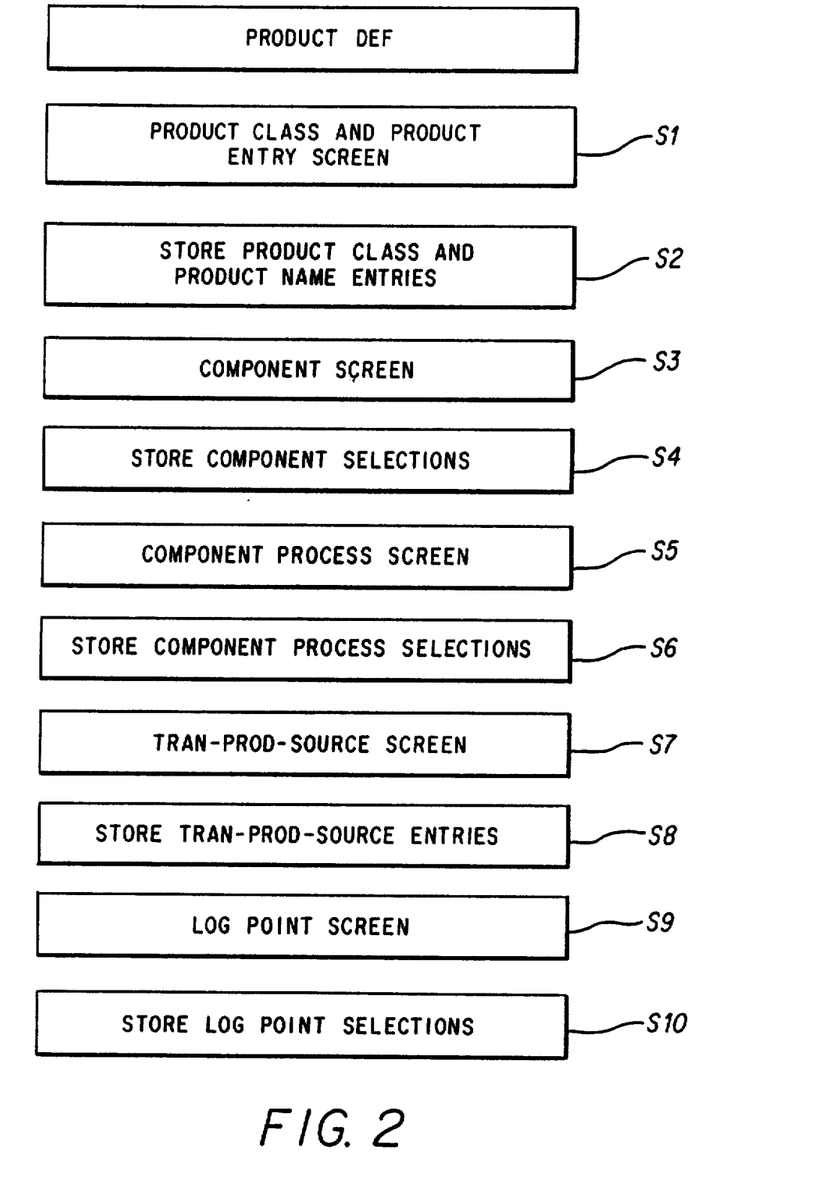
FIG. 2 is a flow chart indicative of system activity in the product planning phase.

Turning to FIG. 2, in product definition (PRODUCT DEF), coordinator unit 36 calls out an initial step S1 (PRODUCT CLASS AND PRODUCT ENTRY SCREEN), which presents a display on terminal 20 for planner entry of product class and product. By way of an example of planner response, the word "savings" might be entered as defining the product class and the word "regular savings" as defining the product. The entry provides for digital data signals to issue from terminal 20 on line 34 and step S2 (STORE PRODUCT CLASS AND PRODUCT NAME ENTRIES) effects storage in planner selection store 18. In step S3 (COMPONENT SCREEN), coordinator unit 36 calls out the contents of component identification store 10 for display by terminal 20. The above-enumerated components are accordingly presented on successive screens along with a selection column in which the planner may make entries correspondingly to the components seen to have applicability in the product being created. Digital signals issue from terminal 20 indicative of selected components and step S4 (STORE COMPONENT SELECTIONS) effects storage thereof in store 18.

Component processes are stored in groupings corresponding to components for recall in such groupings upon component selection. Recall thereof from store 12 and display on terminal 20 is effected in step S5 (COMPONENT PROCESS SCREEN). This display is as above described for component selection and the planner entries of component processes selected for the product are stored in store 18 in step S6 (STORE COMPONENT PROCESS SELECTIONS).

In step S7 (TRAN-PROD-SOURCE SCREEN), coordinator 36 presents a variety of selection screens to permit the planner to choose interrelation of transactions, products and sources, and to enter the applicable institutional disciplines above alluded to for storage in record store 16 in step S8 (STORE TRAN-PROD-SOURCE ENTRIES).

In step S9 (LOG POINT SCREEN), coordinator unit 36 accesses log point identification store 14 and calls for display by terminal 20 of log points and destinations for selection by the planner. Akin to interrelated storage of component processes in groupings correlated with components, storage of log points is made in groupings for each component process. In step S10 (STORE LOG POINT SELECTIONS), coordinator unit 36 effects storage of planner log point selections in planner selection store 18.

The method of FIG. 2 is typically for practice at the time of system installation in an institution and may encompass the establishing of a wide variety of products or an individual product for study and evaluation over time. As will be appreciated, the system flexibility is such that the system planner may add a product to the already in place system by practice of FIG. 2 method at any desired time. Further, a pre-existing product may be modified readily by programming coordinator unit 36 to recall the contents of stores 16 and 18 relating to such product and changing the structure of the product by altering its component processes and log points or modifying the institutional records.

At this juncture, it will be assumed that the method of FIG. 2 has been practiced for definition of numerous products and that the system thus tailored to the planner needs is to be operated by users, such as tellers, ATMs, the system as source, and others. The block diagram of FIG. 3 will facilitate an understanding of this usage phase.

Figure 3:
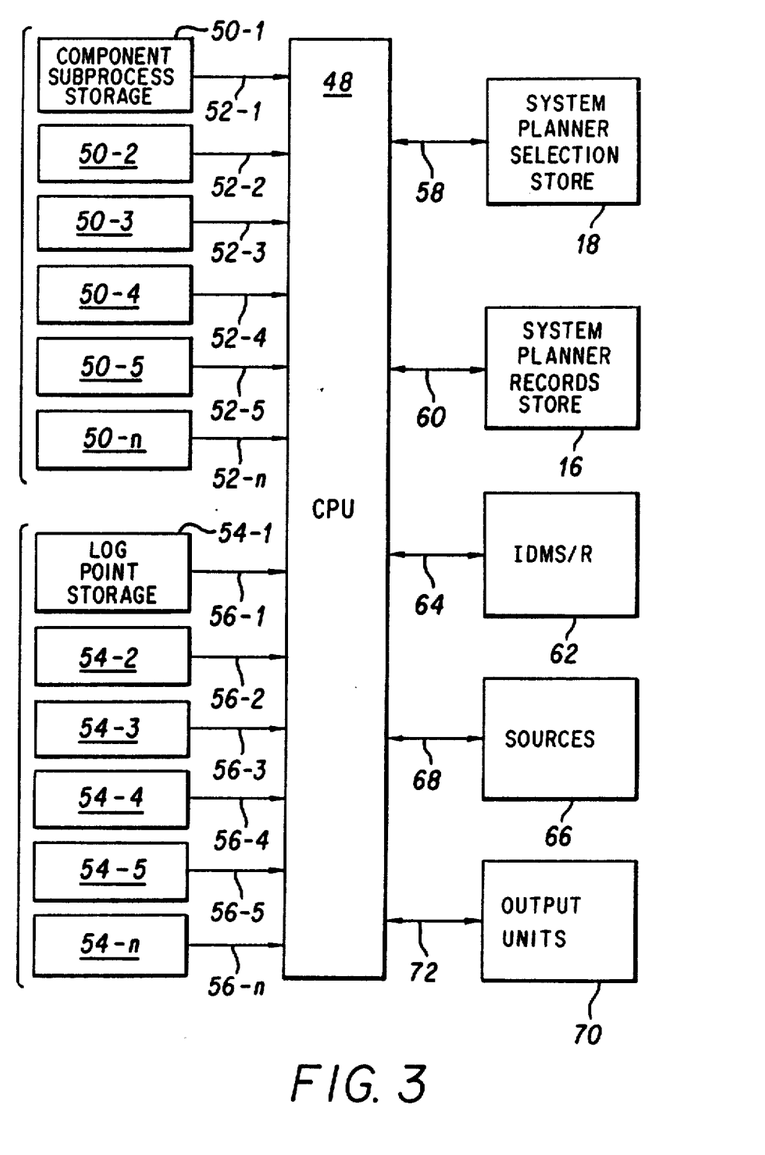
FIG. 3 is a block diagram of the system in its usage phase.

Central processor unit (CPU) 48 of FIG. 3 is suitably programmed to implement coordinator unit 36 of FIG. 1 and the various steps below stated for system usage. Component subprocess storage modules 50-1 through 50-n are connected to CPU 48 over lines 52-1 through 52-n for individual addressing thereof and individual recall of the stored subprocesses. Modules 50-1 through 50-n contain signals indicative of the operative steps of the component subprocesses therein, several of which are discussed in detail at a later stage herein.

Log point storage modules 54-1 through 54-n are connected to CPU 48 over lines 56-1 through 56-n and are individually addressable for content recall. Such log point modules differ from log point identification store 14 of FIG. 1 in containing signals indicative of log point specifications and destinations rather than mere literal identification of log points.

System planner selection store 18 and system planner record store 16 of FIG. 1 are connected to CPU 48 over lines 58 and 60.

IDMS/R 62 is connected to CPU 48 over line 64 and will typically include therein record store 16, such that all system data is in one site. Sources 66 are connected to CPU 48 over lines 68. Output units 70 are connected to the CPU over lines 72 and will include printers, teller terminals and the like.

In operation of the system of FIG. 3, sources 66 communicate transaction requests to CPU 48 and the CPU determines from store 16 the applicable parameters, particularly the transaction code. The CPU thereupon looks to store 18 for planner selected component processes and log points applicable to the transaction for the particular source at hand. The CPU then accesses component subprocess modules 50 and log point modules 54 to implement the transaction. Recourse is made to database 62 for account information, balances, etc., which have been entered in the course of new account openings.

Figure 4:
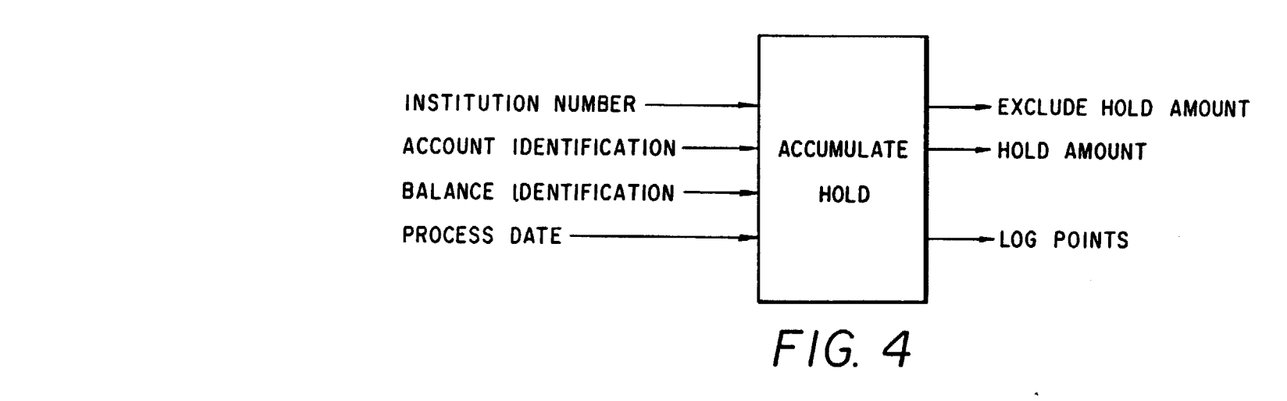
FIGS. 4 through 6 depict block diagrams of typical component process modules usable in the FIG. 3 system.
Figure 5:
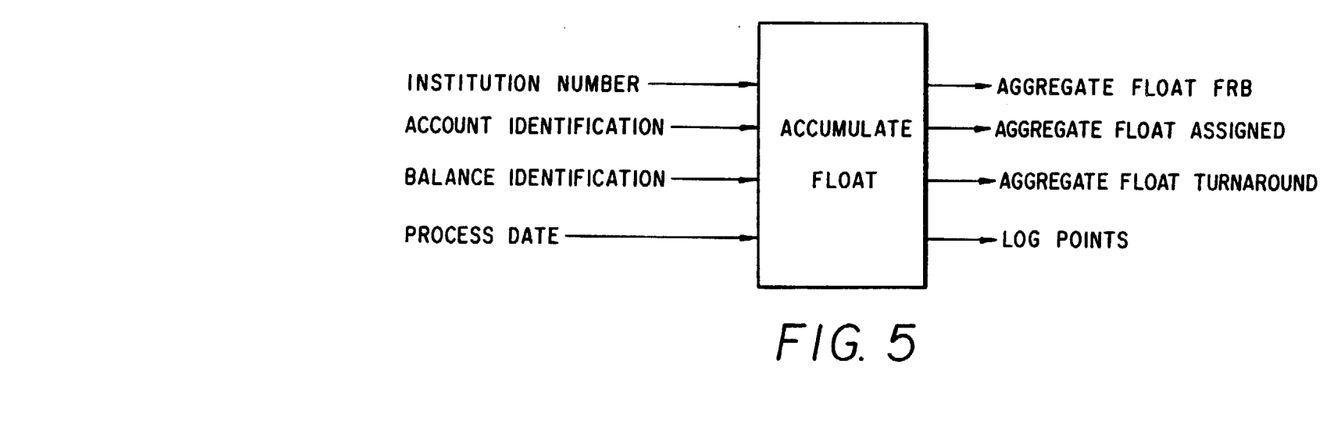
Figure 6:
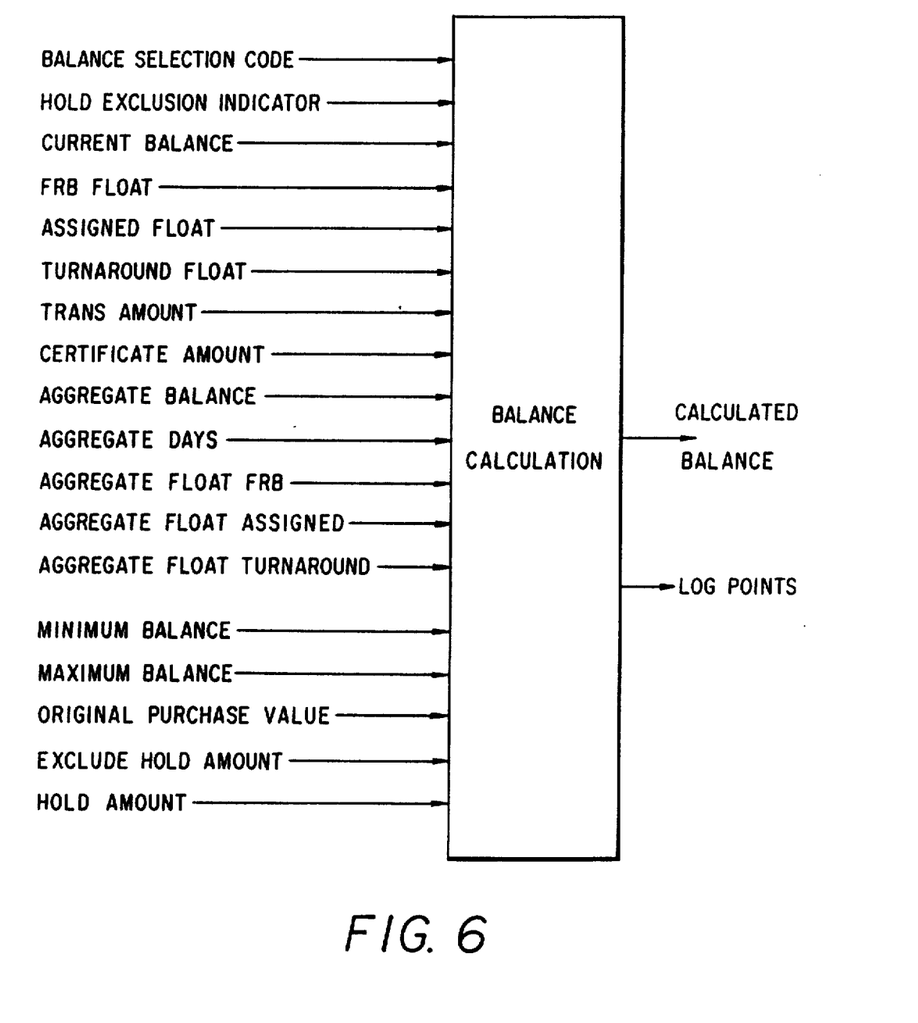

FIGS. 4 through 6 show three exemplary component subprocess modules derived by applicants for use in planning various products specifically for computer implementation of a full banking system. Considering FIG. 4, the ACCUMULATE HOLD subcomponent process has at its inputs the institution number, account identification, the balance presently identified for such account by the operative source and the process date. This module outputs, upon practice of the component subprocess on such input information, one of two results, namely, that the hold amount should be excluded from a transaction or that the hold amount should be applied to such transaction. The steps of the ACCUMULATE HOLD component subprocess are as follows.

a. Obtain the hold account and its first hold detail record.
b. If the hold account record is not found, exit from this module. (This is a log point output of this module.)
c. If there is a database error, log an error message and stop processing. (This is another log point output of this module.)
d. If the process date is not less than the effective date and the process date is not greater than the expiration date, and if the input balance identified is equal to the system stored balance, then advance to steps f. and g.
e. Obtain the next hold detail record and revert to step b.
f. If the account has correspondence with institutional reason codes and exclusion amounts for the account, add hold amount to the output hold amount.
g. If the account does not have correspondence with institutional reason codes and exclusion amounts for the account, subtract the hold amount from the output hold amount.

Considering FIG. 5, the ACCUMULATE FLOAT component subprocess has as it inputs the institution number, account identification, the balance presently identified for such account by the operative source and the process date. This module outputs, upon practice of the component subprocess on such input information, one of three results, namely, an aggregate float frb, an aggregate float assigned or an aggregate float turnaround.

The steps of the ACCUMULATE FLOAT component subprocess are as follows.

a. Obtain the float account and its first float detail record.
b. If the float record is found, (1) add the aggregate float frb to the output aggregate float, (2) add the aggregate float assigned, and (3) add the aggregate foat collected to the output aggregate float turnaround.
c. If the float record is not found, exit from this module. (log point)
d. If the process date is less than the effective date or the process date is greater than the expiration date, or if the input balance identified is not equal to the system stored balance, then advance to step i.
e. If the float type code for the amount is equal to a first assigned institutional code, add the float amount to the output frb float and output aggregate frb float.
f. If the float type code for the account is equal to a second assigned institutional code, add the float amount to output assigned float and output aggregate float assigned.
g. If the float type code for the account is equal to a third assigned institutional code, add the float amount to the output turnaround float and output turnaround float.
h. If the float type code for the account is not equal to any of the first, second and third assigned institutional codes, log record and error message (log point) and stop processing.
i. Obtain the next float detail record and revert to step c.

Considering FIG. 6, the BALANCE CALCULATION component subprocess has at its inputs the balance selection code, hold exclusion indicator, current balance, frb float, assigned float, turnaround float, trans-(action) amount, certificate amount, aggregrate balance, aggregate days, aggregate float frb, aggregate float assigned, aggregate float turnaround, minimum balance, maximum balance, original purchase value, exclude hold amount and hold amount. This module outputs, upon practice of the component subprocess on such input information, the calculated balance.

The component subprocesses of FIGS. 4 and 5 will be noted as being responsive to stored input data not derived from another component subprocess module and to function to provide diverse module output data from such input data. FIG. 6 indicates a further dimension of the invention and its flexibility and versatility. Here, it will be seen that input data to the BALANCE CALCULATION component subprocess module is inclusive of data derived from other modules, namely, the ACCUMULATE HOLD and ACCUMULATE FLOAT component subprocess modules and functions to provide still further diverse module output data.

The steps of the BALANCE CALCULATION component subprocess are as follows.

a. Initialization—calculated balance and error code are set to zero.
b. If the balance selection code is less than 1 or greater than 16, move 1 to error code. (log point)
c. If the hold exclusion indicator is not equal to Y and not equal to N, move 2 to error code. (log point)
d. If the error code is zero and the balance selection code is equal to 1, move the current balance to calculated balance.
e. Subtract the exclusion hold amount from the calculated balance. If the hold exclusion indicator is equal to Y, subtract the hold amount from the calculated balance.
f. If the error code is zero and the balance selection code is equal to 2, calculate and move frb collected to calculated balance. Do step e.
g. If the error code is zero and the balance selection code is equal to 3, calculate and move assigned amount to calculated balance. Do step e.
h. If the error code is zero and the balance selection code is equal to 4, calculate and move turnaround amount to calculated balance. Do step e.
i. If the error code is zero and the balance selection code is equal to 5, move the trans amount to calculated balance. Do step e.
j. If the error code is zero and the balance selection code is equal to 6, move the certificate amount to calculated balance. Do step e.
k. If the balance selection code is equal to 7 and aggregate days is zero, move 3 to the error code. If the error code is zero and the balance selection code is equal to 7, calculate and move the average current balance to calculated balance. Do step e.
l. If the balance selection code is equal to 8 and aggregate days is zero, move 3 to the error code. If the error code is zero and the balance selection code is equal to 8, calculate and move the average frb collected to calculated balance. Do step e.
m. If the balance selection code is equal to 9 and aggregate days is zero, move 3 to the error code. If the error code is zero and the balance selection code is equal to 9, calculate and move the average assigned to calculated balance. Do step e.
n. If the balance selection code is equal to 10 and aggregate days is zero, move 3 to the error code. If the error code is zero and the balance selection code is equal to 10, calculate and move the average turnaround to calculated balance. Do step e.
o. If the error code is zero and the balance selection code is equal to 11, calculate and move the minimum balance to calculated balance. Do step e.
p. If the error code is zero and the balance selection code is equal to 12, calculate and move the maximum balance to calculated balance. Do step e.
q. If the error code is zero and the balance selection code is equal to 13, move the original purchase value to calculated balance. Do step e.
r. If the error code is zero and the balance selection code is equal to 14, calculate and move the frb included to calculated balance. Do step e.
s. If the error code is zero and the balance selection code is equal to 15, calculate and move assigned float included to calculated balance. Do step e.
t. If the error code is zero and the balance selection code is equal to 16, calculates and move the turnaround float included to calculated balance. Do step e.
u. Exit from the module.

As will be seen from the above, following initialization, this component subprocess confirms propriety of the selection code as corresponding (1 through 16) to the asset account inputs to this module. The process then confirms that the hold exclusion indicator at hand at the input is not one of two institutional values (Y and N) which would represent error in use of this component subprocess. It then practices computational step e. in accordance with the actual selection code at hand. The component process thus comprises computational and log point activity and, as noted above, is in chain relation to other modules (ACCUMULATE HOLD, ACCUMULATE FLOAT) by CPU code corresponding to the component processes.

As will be understood by those in the banking field, the computational activities involved in accumulating holds and floats are common to various parent computational activities other than the calculation of balance, as in the above example of FIG. 6. Thus, the activities of accumulating holds and floats are performed in parent computational activities of computing accured interest. Indeed the component subprocess of FIG. 6 is itself used in computations of accured interest. Thus, under the invention, the very same component subprocess module may be used over and over in realizing component processes.

Figure 7:
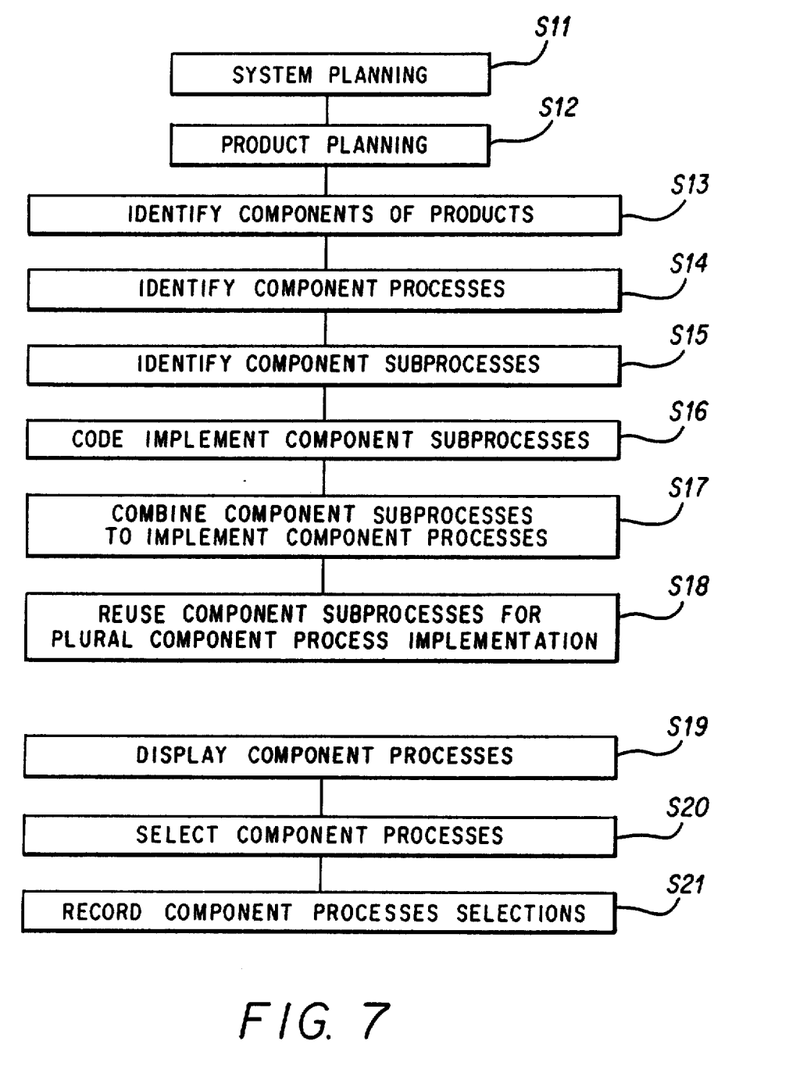
FIG. 7 is a flowchart providing an understanding of architecture parent to the system of the invention.

Beyond the foregoing, the architecture provided by the invention will be further understood from a consideration of the flow chart of FIG. 7. The ultimate step is that of step S11 (SYSTEM PLANNING), reached immediately by the step S12 (PRODUCT PLANNING). Step 13 (IDENTIFY COMPONENTS OF PRODUCTS) is a precursor to product planning. Step 14 (IDENTIFY COMPONENT PROCESSES) is a part of product planning. Steps S11 through S14 are reached by the system designer, typically through discussion of the system designer, one skilled in systems analysis and code preparation, with the institutional planner, one presumed not to have these latter skills.

Step S15 (IDENTIFY COMPONENT SUBPROCESSES) is uniquely in the province of the system designer, as are step S16 (CODE IMPLEMENT COMPONENT SUBPROCESSES), step S17 (COMBINE COMPONENT SUBPROCESSES TO IMPLEMENT COMPONENT PROCESSES) and step S18 (REUSE COMPONENT SUBPROCESSES FOR PLURAL COMPONENT PROCESS IMPLEMENTATION).

Steps S19 (DISPLAY COMPONENT PROCESSES), S20 (SELECT COMPONENT PROCESSES) and S21 (RECORD COMPONENT PROCESS SELECTIONS) are uniquely in the province of the institutional planner, once the designer activity is completed.

Architecture or methodology underlying the invention will thus be seen as involving a first step or providing pluralities of first code (CPU code defining component processes) accessible to the institutional planner and thereby executable by such planner upon display and selection of component processed. A second step is that of providing pluralities of second code (component subprocess codes) inaccessible to the institutional planner and thereby non-executable by such planner, but accessible to the system designer and selectively combinable by such designer. In effect, applicants create a system adaptive to the presence and involvement of a planner in product making by the inclusion of some code selectively executable by the planner.

Various changes may be introduced in the foregoing system embodiment and modifications may be made to the described methods without departing from the invention. Thus, as noted, while the system and method are shown in specific application to the business environment of banking, they are of course applicable to other business functions. It is to be appreciated that the particularly disclosed and depicted preferred embodiment and practice is intended in an illustrative and not in a limiting sense. The true spirit and scope of the invention is set forth in the following claims.

What is claimed is:

1. In a method for computer implementation of products having components realizable by component processes, the steps of:
   (a) providing pluralities of first code defining said component processes and also defining conditions for the use of information collected in the course of practice of said component processes and making said first code accessible for execution by a planner of said products;
   (b) providing a display of literal identifications of said component processses and said conditions defined in said first code and thereby enabling planner selection of said component processes with selected conditions, such selection effecting such execution of said pluralities of said first code and thereby creating a selected one of said products; and
   (c) providing pluralities of second code defining component subprocesses inaccessible to said planner, and computer combining such second code in sequences defining selected component processes with selected conditions, whereby said planner execution of said first code provides for execution by said computer of said second code, thereby to effect products at planner option having said selected component processes with said selected conditions therein.

2. The invention claimed in claim 1 wherein said step (c) is practiced by repetitive use of individual such second code in the implementation of plural such products.

3. The method claimed in claim 1 wherein said step (a) provides further pluralities of said first code to define said products and classes for said products and wherein said step (b) is practiced further to provide a display of literal identification of said classes and of the products therein and thereby enabling planner selection of said products.

4. The method claimed in claim 1 wherein said step (a) provides further pluralities of said first code to define components of said products and wherein said step (b) is practiced further to provide a display of literal identification of said components and thereby enabling planner selection of said components of said products.

5. A method for computer implementation of products having components realizable by component processes, said method comprising the steps of:
   (a) providing pluralities of first code defining said products and classes for said products, components of said products, said component processes and conditions for the use of information collected in the course of practice of said component processes and making said first code accessible for execution by a planner of said products;
   (b) providing a display
      (1) initially of literal identifications of said classes for said products and said products, thereby enabling planner selection of said products,
      (2) then of said components of said products, thereby enabling planner selection of components for said products, and
      (3) then of said component processes and said conditions defined in said first code and thereby enabling planner selection of said component processes with selected conditions,
   such selection effecting such execution of said pluralities of said first code and thereby creating a selected one of said products; and (c) providing pluralities of second code defining component subprocesses inaccessible to said planar, and computer combining such second code in sequences defining selected component processes with selected conditions, whereby said planner execution of said first code provides for execution by said computer of said second code, thereby to effect products at planner option having said selected components and component processes with said selected conditions therein.

* * * * *

REEXAMINATION CERTIFICATE (3914th)
United States Patent [19]
Bone et al.

[11] B1 4,974,160
[45] Certificate Issued  *Nov. 2, 1999

[54] MENU SELECTED APPLICATION PROGRAMS CREATED FROM DEFINED MODULES OF CODE

[75] Inventors: William K. Bone, Willowbrook; John M. Giannini, St. Charles, both of Ill.

[73] Assignee: Computer Associates International, Inc., Garden City, N.Y.

Reexamination Requests:
No. 90/002,318, Apr. 12, 1991
No. 90/003,260, Nov. 22, 1993
No. 90/004,312, Jul. 25, 1996

Reexamination Certificate for:
Patent No.: 4,974,160
Issued: Nov. 27, 1990
Appl. No.: 07/366,650
Filed: Jun. 15, 1989

[*] Notice: This patent is subject to a terminal disclaimer.

Related U.S. Application Data

[63] Continuation of application No. 07/073,501, Jul. 15, 1987, abandoned.

[51] Int. Cl.$^6$ ........................... G06F 1/00
[52] U.S. Cl. ............ 345/331; 364/191; 364/225; 364/225.1; 364/225.2; 364/286; 364/DIG. 1; 345/353; 345/971
[58] Field of Search ................ 364/400, 188, 364/191, 192, 474.23, 474.24; 395/701, 702, 140, 141, 922, 326

[56] References Cited

U.S. PATENT DOCUMENTS

| | | | |
|---|---|---|---|
| 4,423,316 | 12/1983 | Sano et al. | 235/379 |
| 4,546,435 | 10/1985 | Herbert et al. | 395/700 |
| 4,606,001 | 8/1986 | Rieben et al. | 364/167 |

(List continued on next page.)

FOREIGN PATENT DOCUMENTS

0181438  5/1986  European Pat. Off. .

OTHER PUBLICATIONS

IBM Technical Disclosure Bulletin, vol. 14, No. 1, 306–311.
IBM Technical Disclosure Bulletin, vol. 29, No. 9, 3828–29; and.
Article referring to William J. Lynott, *ProKey 4.0* Software Review, vol. 4 Online Today No. 11, Nov. 1985 at 37.
Article referring to Michael Nesserella, *RE/Call* Software Review, 410 PC Report, Oct. 1985, at 52.
Article referring to Harold Sims, *ProKey* Software Review, vol. 2, TI Professional Computing, No. 10, Oct. 1985 at 6.

(List continued on next page.)

*Primary Examiner*—Robert A. Weinhardt

[57] ABSTRACT

A system and method are disclosed for computer implementation of products wherein a designer examines the products desired by an institution planner and identifies functions ("components") collectively common thereto. The designer proceeds to define component processes collectively common to such components and categorizes code for this purpose in groupings selectable (executable) by the planner upon system installation and subsequently changeable as desired. The component process selections of the planner are recorded and the system is thereby defined in its aspect which is accessible to the planner. The designer works from such definitions of all components and component processes obtained from discussion with system planners prior to installations to define component subprocesses collectively common to the component processes and identifies combinations of component subprocesses in various sequences to realize component processes. The code of each component subprocess is stored individually in "modules" for access by a computer to realize such combinations and reuse of such modules in this activity is effective to provide for uniformity in the practice of subcomponent processes from product to product. The designer code for the component subprocess is inaccessible to the planner from a selection viewpoint and is viewed thusly as planner non-executable.

U.S. PATENT DOCUMENTS

| | | | |
|---|---|---|---|
| 4,734,854 | 3/1988 | Afshar | 364/200 |
| 4,742,467 | 5/1988 | Messerich et al. | 364/200 |
| 4,757,459 | 7/1988 | Lauchnor et al. | 364/474.23 |
| 4,791,550 | 12/1988 | Stevenson et al. | |
| 4,827,404 | 5/1989 | Barstow et al. | 395/100 |
| 4,831,524 | 5/1989 | Furgerson | 364/900 |
| 4,841,441 | 6/1989 | Nixum et al. | 395/922 |
| 4,860,204 | 8/1989 | Gendron et al. | 395/922 |
| 4,868,785 | 9/1989 | Jordan et al. | 395/140 |
| 4,943,932 | 7/1990 | Lark et al. | |
| 4,969,109 | 11/1990 | Mizano et al. | 364/468 |
| 4,974,160 | 11/1990 | Bone et al. | 364/200 |

OTHER PUBLICATIONS

Article referring to Amanda Hixon, *Lotus 1–2–3, Integrated Program For The IBM PC*, vol. 5 Infoworld No. 31, Aug. 1, 1983 at 39.

Horowitz, E. et al. "A survey of application generators", *IEEE Software*, vol. 2, No. 1, Jan. 1985, 40–54.

Bankplus™ advertisement, *Computers in Banking*, vol. 2, No. 1, Mar. 1985, 12–13.

Maxim 4700™ advertisement, *Computers in Banking*, vol. 2, No. 1, Mar. 1985, 48–49.

Busnello, P. et al. "Structure of a source program generator", *IBM Technical Disclosure Bulletin*, vol. 14, No. 1, Jun. 1971, 306–11.

"Driver–driven common programs", *IBM Technical Disclosure Bulletin*, vol. 29, No. 9, Feb. 1987, 3828–9.

"Automate Your Software; SuperKey", Run White, Popular Computing vol. 4, No. 12, pp. 62–69, Oct. 1985, Abstract AN85–027956 Microsearch file of Orbit.

"Lotus 1–2–3, Integrated Program for IBM PC", InfoWorld vol. 5, No. 31, pp. 39–41, Aug. 1, 1983, Amanda Hixon, AN:83–006706 Microsearch File of Orbit.

"RE/Call", PC Report No. 410, p. 52, Oct. 1985, Michael Nesseralla, Abstract from Microsearch File of Orbit AN:85–029720.

"ProKey 4.0", Online Today vol. 4, No. 11, p. 37, Nov. 1985, William Lyncott, Abstract From Microsearch File Of Orbit AN:86–029913.

"ProKey for the PRO", TI Professional Computing vol. 2, No. 10, pp. 6–8, Oct. 1985, Harold Sims, Abstract Microsearch File of Orbit AN:85–029671.

B1 4,974,160

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3–4 and 5 are determined to be patentable as amended.

New claim 6 is added and determined to be patentable.

1. In a *computer, a* method for [computer implementation of] *implementing* products having components realizable by component processes, *said method comprising* the steps of:
   (a) providing pluralities of first code defining said component processes and also defining *a plurality of selectable log points defining pre-defined* conditions for the use of information collected in the course of practice of said component processes [and making said first code accessible for execution by a planner of said products; (b) providing a display]*, said component processes and said plurality of selectable log points being represented by a displayed plurality* of literal identifications of said component processes and said [conditions defined in] *selectable log points such that* said *pluralities of* first code [and thereby enabling] *are selectable by a* planner *for planner execution;*
   (b) *recording a* selection *of particular ones* of said [component processes with selected conditions, such] *plurality of literal identifications made by said planner,* said selection effecting such *planner* execution of said pluralities of first code and [thereby] creating a select[ed] one of said products [and] *having selected component processes with selected log points*;
   (c) providing [pluralities of second code defining] *a plurality of pre-defined* component subprocesses inaccessible to said planner[, and] *such that said component subprocesses are* computer [combining such second code]-*combinable* in *various call* sequences [defining] *to fully realize said* selected component processes with *said* selected [conditions] *log points; and* [, whereby said planner execution of said first code provides for execution by said computer of said second code, thereby to effect products at planner option having said selected components processes with said selected conditions therein.]
   (d) *computer-combining said component subprocesses in a call sequence for realizing said selected component processes with said selected log points and calling said component subprocesses in said call sequence, whereby said planner execution of said first code provides for calling said component subprocesses in said call sequence so as to effect implementation of said select one of said products having said selected component processes with said selected log points.*

3. The method [claimed in] *of* claim 1, wherein said [step (a) provides further] pluralities of said first code [to] *further* define[components of]*s* said products and classes for said products; and
   wherein said [step (b) is practiced further to provide a display] *plurality* of literal identification*s includes representations* of said classes and of [the] *said* products therein [and thereby enabling] *such that said products are selectable by said* planner [selection of said products].

4. The method [claimed in] *of* claim 1, wherein said [step (a) provides further] pluralities of first code [to] *further* define*s* components of said products; and
   wherein said [step (b) is practiced further to provide a display] *plurality* of literal identification*s includes representations* of said components [and thereby enabling] *such that said components of said products are selectable by said* planner [selection of said components of said products].

5. [A] *In a computer, a* method for [computer implementation of] *implementing* products having components realizable by component processes, said method comprising the steps of:
   (a) providing pluralities of first code defining said products and classes for said products, components of said products, said components processes, and *also defining a plurality of selectable log points defining pre-defined conditiond for the use of information collected in the course of practice of said component processes*[and making said first code accessible for execution by a plannar of said products; (b) providing a display (1) initially of literal identifications of said classes for said products and said products, thereby enabling planner selection of said products, (2) then of said components of said products, thereby enabling planner selection of components for said products, and (3) then of said component processes and said conditions defined in said first code and thereby enabling planner selection of said component processes with selected conditions,]*, wherein said products, said classes for said products, said components, said component processes and said plurality of selectable log points are represented by a displayed plurality of literal identifications such that said pluralities of first code are selectable by a planner for planner execution;*
   (b) [such] *recording a selection of particular ones of said plurality of literal identifications made by said planner,* said selection effecting such *planner* execution of said pluralities of said first code and [thereby] creating a select[ed] one of said products [and] *having selected components and selected component processes with selected log points*;
   (c) providing [pluralities of second code defining] *a plurality of pre-defined* component subprocesses inaccessible to said [planar, and] *planner such that said component subprocesses are* computer[combining such second code] computer-*combinable* in *various call* sequences [defining] *to fully realize said* selected component processes with *said* selected [conditions, whereby said planner execution of said first code provides for execution by said computer of said second code, thereby to effect products at planner option having said selected components and component processes with said selected conditions therein.] *log points; and*
   (d) *computer-combining said component subprocesses in a call sequence for realizing said selected component processes with said selected log points and calling said component subprocesses in said call sequence, whereby said planner execution of said first code*

*provides for calling said component subprocesses in said call sequence so as to effect implementation of said select one of said products having said selected components and component processes with said selected log points.*

6. *A method for implementing software products on a computer, said method comprising the steps of:*

(a) *providing a plurality of first code defining component processes for realizing software products such that each of said plurality of component processes defines a task component of software products, and said plurality of first code also defining a plurality of log points defining pre-defined conditions for the use of information collected in the course of practice of said component processes, wherein each of said plurality of component processes and said plurality of log points are selectable by said product planner;*

(b) *providing a plurality of pre-defined subprocess modules collectively common to said plurality of component processes such that each of said plurality of pre-defined subprocesses modules is individually recallable and includes one or more ordered steps for implementing a portion of at least one of said plurality of component processes in a computer, and is combinable with other ones of said plurality of pre-defined subprocess modules in various call sequences, wherein none of said plurality of pre-defined subprocess modules is selectable or accessible by said product planner, and wherein said plurality of subprocess modules is so defined such that each of said plurality of component processes and said log points are realizable as a combination of at least one of said plurality of pre-defined subprocess modules provided in at least one call sequence;*

(c) *displaying a plurality of literal identifications for selection by said product planner, said plurality of literal identifications representing said plurality of component processes and said plurality of log points;*

(d) *recording a selection of particular ones of said plurality of literal identifications made by said planner, said selection effeting planner execution of said plurality of first code and creating a select one of said software products having said selected component processes with said selected log points; and*

(e) *computer-combining said plurality of pre-defined subprocess modules in various call sequences for realizing said selected component processes with said selected log points and calling said component subprocesses in said various call sequences, whereby said planner execution of said first code provides for calling said component subprocesses in said various call sequences so as to effect implementation of said select one of said software products having said selected component processes with said selected log points.*

\* \* \* \* \*